(12) United States Patent
Liu

(10) Patent No.: US 11,772,318 B2
(45) Date of Patent: Oct. 3, 2023

(54) FIBER PRODUCT FOLDING APPARATUS

(71) Applicant: CHAN LI MACHINERY CO., LTD., Taoyuan (TW)

(72) Inventor: Wen-Cheng Liu, Taoyuan (TW)

(73) Assignee: Chan Li Machinery Co., Ltd., Taoyuan (TW)

( * ) Notice: Subject to any disclaimer, the term of this patent is extended or adjusted under 35 U.S.C. 154(b) by 254 days.

(21) Appl. No.: 17/242,690

(22) Filed: Apr. 28, 2021

(65) Prior Publication Data

US 2022/0314524 A1 Oct. 6, 2022

(30) Foreign Application Priority Data

Apr. 1, 2021 (TW) .................................. 110112030

(51) Int. Cl.
*B29C 53/04* (2006.01)
*B65H 45/28* (2006.01)
(Continued)

(52) U.S. Cl.
CPC ............ *B29C 53/043* (2013.01); *B26D 1/405* (2013.01); *B26D 9/00* (2013.01); *B26F 1/20* (2013.01);
(Continued)

(58) Field of Classification Search
CPC ........ B29C 53/043; B26D 1/405; B26D 9/00; B26F 1/20; B65H 45/24; B65H 45/28;
(Continued)

(56) References Cited

U.S. PATENT DOCUMENTS

| 4,725,469 A | * | 2/1988 | Summerfield | ......... B65H 45/24 |
|---|---|---|---|---|
| | | | | 221/48 |
| 7,458,927 B2 | * | 12/2008 | Kauppila | ............... B65H 45/24 |
| | | | | 270/32 |

(Continued)

FOREIGN PATENT DOCUMENTS

WO 2013029678 A1 3/2013

OTHER PUBLICATIONS

International Office Action dated Oct. 18, 2021, for corresponding Patent Application No. 21171019.9-1017.

*Primary Examiner* — Sameh Tawfik
(74) *Attorney, Agent, or Firm* — Rosenberg, Klein & Lee

(57) ABSTRACT

A fiber product folding apparatus includes a first dashed-line cutting device used to form a plurality of first dashed lines on a first fiber product. Through control of the rotational speed of the first dashed-line roller, the interval between adjacent first dashed lines is adjusted. A first severing device receives the first fiber product with the first dashed lines by a predetermined length and cuts off the first fiber product. A second dashed-line cutting device is used to form a plurality of second dashed lines on a second fiber product. Through control of the rotational speed of the second dashed-line roller, the interval between adjacent second dashed lines can be adjusted. A second severing device receives the second fiber product that includes the second dashed lines by a predetermined length and cuts off the second fiber product. Finally, the first fiber product and the second fiber product are conducted to pass between a first folding roller and a second folding roller to proceed with folding. Since the dashed line interval of the fiber products is the size or length of a single sheet of fiber product, controlling the rotational speeds of the dashed-line rollers would allow for adjustment such that folding can be performed for multiple forms.

10 Claims, 9 Drawing Sheets

(51) Int. Cl.
*B26D 1/40* (2006.01)
*B26D 9/00* (2006.01)
*B26F 1/20* (2006.01)
*B65H 45/24* (2006.01)

(52) U.S. Cl.
CPC ............ *B65H 45/24* (2013.01); *B65H 45/28* (2013.01); *B65H 2301/5152* (2013.01); *B65H 2511/11* (2013.01); *B65H 2701/12112* (2013.01)

(58) Field of Classification Search
CPC ........ B65H 2301/5152; B65H 2511/11; B65H 2701/12112
USPC .......................... 493/413, 420, 419, 442, 424
See application file for complete search history.

(56) References Cited

U.S. PATENT DOCUMENTS

| | | | | |
|---|---|---|---|---|
| 9,388,016 | B2 * | 7/2016 | De Matteis | B65H 45/24 |
| 10,449,746 | B2 * | 10/2019 | Bretting | B31D 1/04 |
| 11,084,681 | B2 * | 8/2021 | Andersson | B65H 45/24 |
| 11,345,563 | B2 * | 5/2022 | Liu | B65H 45/24 |
| 2005/0124481 | A1 * | 6/2005 | d'Agrella | B65H 29/60 |
| | | | | 493/405 |
| 2006/0052228 | A1 * | 3/2006 | De Matteis | B65H 45/24 |
| | | | | 493/360 |
| 2006/0154794 | A1 * | 7/2006 | Couturier | B65H 45/24 |
| | | | | 493/427 |
| 2009/0137375 | A1 * | 5/2009 | Tsai | B65H 45/24 |
| | | | | 493/442 |
| 2016/0264373 | A1 * | 9/2016 | Kauppila | B65H 37/06 |
| 2020/0247639 | A1 * | 8/2020 | Liu | B65H 45/1015 |
| 2021/0047142 | A1 * | 2/2021 | Mazzaccherini | B65H 45/162 |

\* cited by examiner

FIBER PRODUCT FOLDING APPARATUS

BACKGROUND OF THE INVENTION

1. Field of the Invention

The present invention relates to a fiber product folding mechanism, and more particularly to a folding apparatus that enables adjustment of a size or length of a single sheet of a fiber product and the forms of folding.

2. The Related Arts

Referring to FIG. 1, a schematic view is provided to illustrate a structure of a known fiber product folding device. As shown in the drawing, the known fiber product folding device 10 generally comprises a first cutter 131, a second cutter 132, a first cutting roller 121, a second cutting roller 122, a first folding roller 111, and a second folding roller 112 to carry out cutting and folding of a first fiber product 11 and a second fiber product 12. The first cutting roller 121 and the second cutting roller 122 are adjacent to each other and the two are rotated in opposite directions. For example, the first cutting roller 121 is rotated in a counterclockwise direction, while the second cutting roller 122 is rotated in a clockwise direction.

The first cutting roller 121 and the second cutting roller 122 are each provided with a plurality of cutters and a plurality of notches. Taking the first cutting roller 121 as an example, a roller surface of the first cutting roller 121 is formed with a plurality of cutters 1211 and a plurality of notches 1212 that are alternate with each other and are spaced from each other. The first cutting roller 121 and the second cutting roller 122 are each connected to a vacuum generation device (not shown), so that vacuum suction is applied to keep the first fiber product 11 and the second fiber product 12 attached to the roller surfaces.

During the rotation of the first cutting roller 121 and the second cutting roller 122, the first fiber product 11 and the second fiber product 12 are driven to move by means of the vacuum suction. When the cutters 1211 of the first cutting roller 121 have been rotated to a position corresponding to the first cutter 131, the first cutter 131 is activated to puncture the first fiber product 11, so as to cut off a single sheet of the first fiber product 11. Similarly, when the cutters of the second cutting roller 122 have been rotated to a position corresponding to the second cutter 132, the second cutter 132 is activated to puncture the second fiber product 12, so as to cut off a single sheet of the second fiber product 12.

The first fiber product 11 and the second fiber product 12 that are so cut off are stacked together and then the second folding roller 112 and the first folding roller 111 adjacent thereto are operated to fold a portion the single-sheet fiber product that is so stacked to form an interfolded fiber product.

However, since the spacing between the cutters of the first cutting roller 121 and those of the second cutting roller 122 are fixed and invariable, the single sheets of the first fiber product 11 and the second fiber product 12 so cut are of a fixed size or length. The final product formed through folding by the second folding roller 112 and the first folding roller 111 is of a fixed specification or form. To change the size or length of the single-sheet fiber product in order to make products of different forms through folding, it needs to switch to a new machine. This makes it not possible to save cost and also makes the space used expanded, and is thus inconvenient.

SUMMARY OF THE INVENTION

Thus, the primary objective of the present invention is to provide a fiber product folding apparatus, in which fiber products, after being fed in, are not suction-attached to the cutting rollers, and the cutting rollers are controllable in respect of the rotational speeds, so that when the rotational speeds of the cutting rollers are fast, the size of a single-sheet fiber product cut thereby is relatively short, and in an opposite case, the size is relatively long. As such, adjustment of the size or length of a single-sheet fiber product can be realized, and folding for multiple forms can be performed, such as C-shaped fashion, Z-shaped fashion, and W-shaped fashion that are different fashions of folding.

A technical solution adopted in the present invention comprises a first dashed-line cutting device including a first dashed-line cutter and a first dashed-line roller arranged adjacent to the first dashed-line cutter, wherein a first fiber product moves in a first conveying direction to pass between the first dashed-line cutter and the first dashed-line roller, and the first dashed-line cutter is operable with respect to the first dashed-line roller to form a plurality of first dashed lines on the first fiber product across a width direction of the first fiber product, wherein adjacent first dashed lines are spaced from each other by an interval along the first conveying direction, and the interval between the adjacent first dashed lines is adjustable by controlling a rotational speed of the first dashed-line roller with respect to the first dashed-line cutter. A first severing device includes a first severing cutter, a first severing roller adjacent to the first severing cutter, and a first intermediate roller adjacent to the first severing roller, wherein the first severing roller receives the first fiber product that is formed with the first dashed lines, and when a length of the received first fiber product does not reach a predetermined length, the first severing cutter is kept inactive, and the first fiber product is forwarded to the first intermediate roller. A first folding roller adjacent to the first intermediate roller is arranged to receive the first fiber product via the first intermediate roller. A second dashed-line cutting device includes a second dashed-line cutter and a second dashed-line roller arranged adjacent to the second dashed-line cutter, wherein a second fiber product moves in a second conveying direction to pass between the second dashed-line cutter and the second dashed-line roller, and the second dashed-line cutter is operable with respect to the second dashed-line roller to form a plurality of second dashed lines on the second fiber product across a width direction of the second fiber product, wherein adjacent second dashed lines are spaced from each other by an interval along the second conveying direction, and the interval between the adjacent second dashed lines is adjustable by controlling a rotational speed of the second dashed-line roller with respect to the second dashed-line cutter. A second severing device includes a second severing cutter, a second severing roller adjacent to the second severing cutter, and a second intermediate roller adjacent to the second severing roller, wherein the second severing roller receives the second fiber product that is formed with the second dashed lines, and when a length of the received second fiber product does not reach a predetermined length, the second severing cutter is kept inactive, and the second fiber product is forwarded to the second intermediate roller. A second folding roller adjacent to the second intermediate roller is arranged to receive the second fiber product via the second intermediate roller. The first folding roller and the second folding roller are arranged adjacent to each other and are operable to perform folding of the first fiber product and the second fiber product that pass between the first folding roller and the second folding roller at a fold length.

As such, the present invention effectively overcomes the drawback of the prior art that switching among machines must be performed in the need of adjusting the size or length of a single sheet of fiber product or performing folding of multiple forms, such that there is no way of reducing cost and saving space.

A specific technical solution adopted in the present invention will be further described with reference to an embodiment thereof and the attached drawings.

DETAILED DESCRIPTION OF THE PREFERRED EMBODIMENTS

Figure 1:
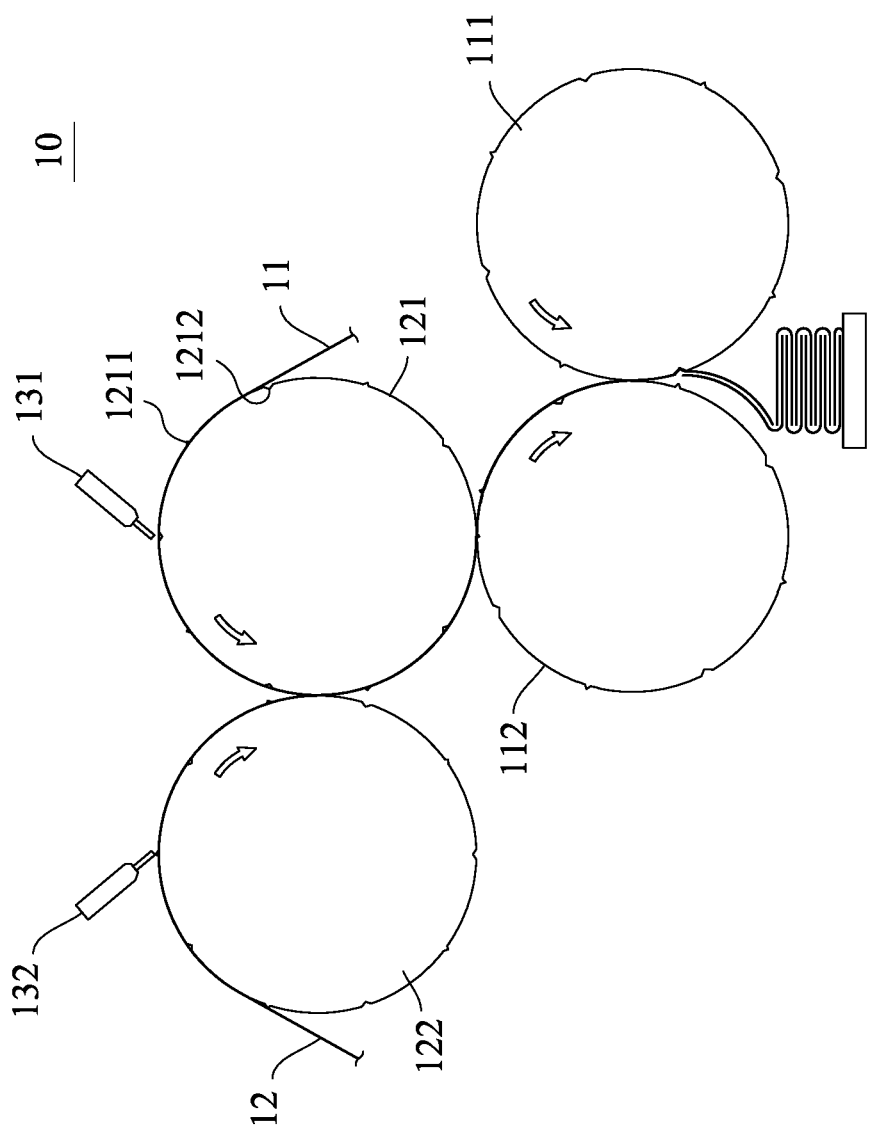
FIG. 1 is a schematic view illustrating a structure of a known fiber product folding device.
Figure 2A:
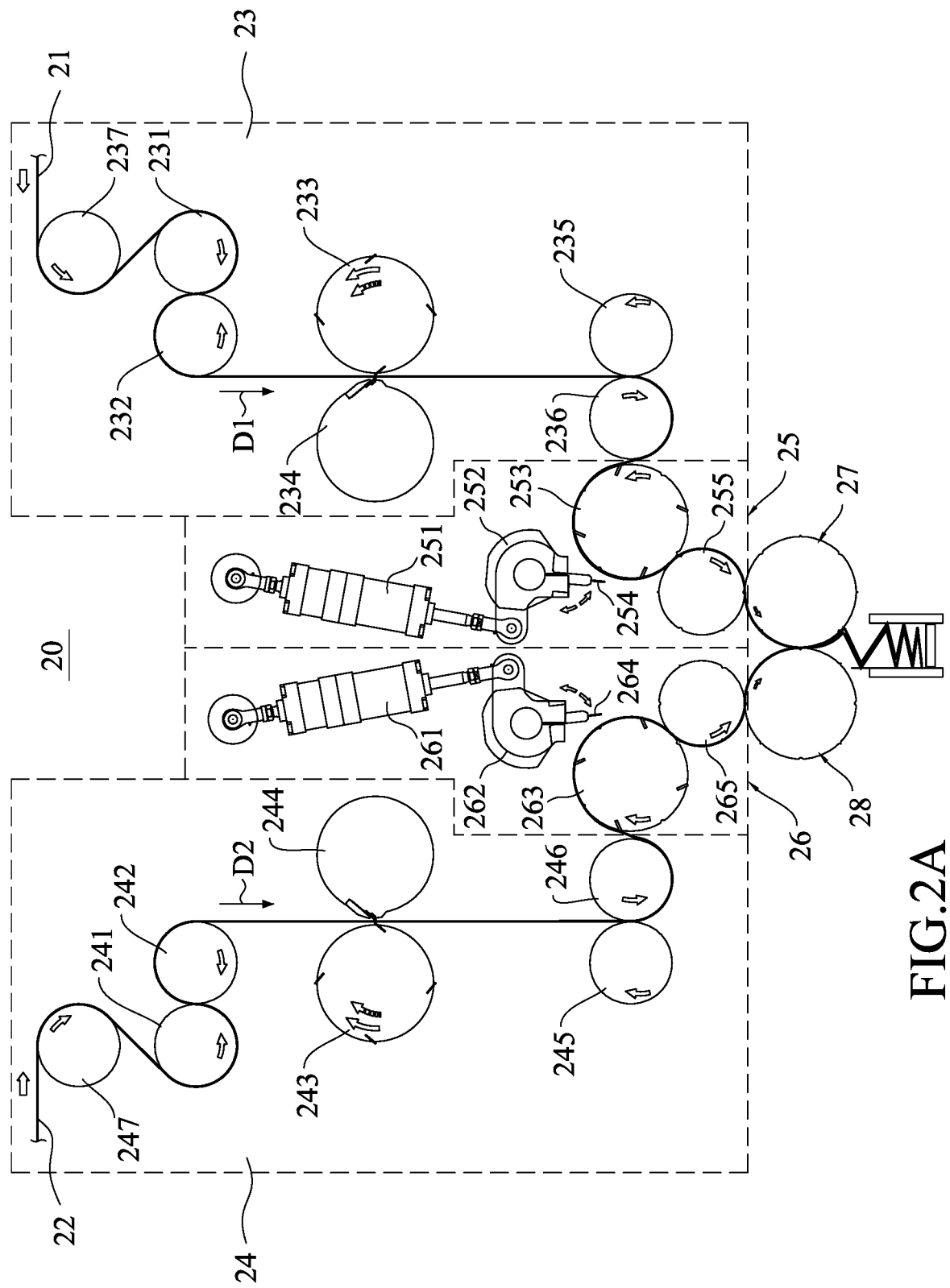
FIG. 2A is schematic view illustrating a structure of a fiber product folding apparatus according to a first embodiment of the present invention.

Referring to FIG. 2A, a fiber product folding apparatus according to an embodiment of the present invention, generally designated at 20, comprises a first dashed-line cutting device 23 and a second dashed-line cutting device 24, which are operable to cut a first fiber product 21 and a second fiber product 22, respectively, by way of intermittent dashed-line cutting. The term "dashed-line cutting" as used herein is defined as forming a cutting line in the form of a line of intermittent dashes in a fiber product, but not completely cutting off or severing the fiber product.

When the first fiber product 21 and the second fiber product 22 advance in a conveying direction to reach a predetermined length after the intermittent dashed-line cutting, a stack switching procedure is performed. During the stack switching procedure, a first severing device 25 and a second severing device 26 completely cut off or sever the first fiber product 21 and the second fiber product 22. If the first fiber product 21 and the second fiber product 22 does not reach the predetermined length after the intermittent dashed-line cutting, then the first severing device 25 and the second severing device 26 are not put into operation. Afterwards, the first fiber product 21 and the second fiber product 22 that have been severed are subject to folding by a first folding roller 27 and a second folding roller 28 that are arranged adjacent to each other.

The first dashed-line cutting device 23 comprises two upper feeding rollers 231, 232 that are adjacent to each other, a first dashed-line roller 233, a first dashed-line cutter 234, two lower feeding rollers 235, 236 that are adjacent to each other, and a rolling wheel 237. The first dashed-line roller 233 has a roller surface that includes a plurality of cutters and a plurality of notches that are arranged thereon in a mutually spaced manner. The first fiber product 21 is drawn in by the rolling wheel 237, passing between the two adjacent upper feeding rollers 231 and 232, and advancing in a first conveying direction D1 to pass between the first dashed-line roller 233 and the first dashed-line cutter 234 to then move to a location between the lower feeding rollers 235, 236.

Figure 3A:
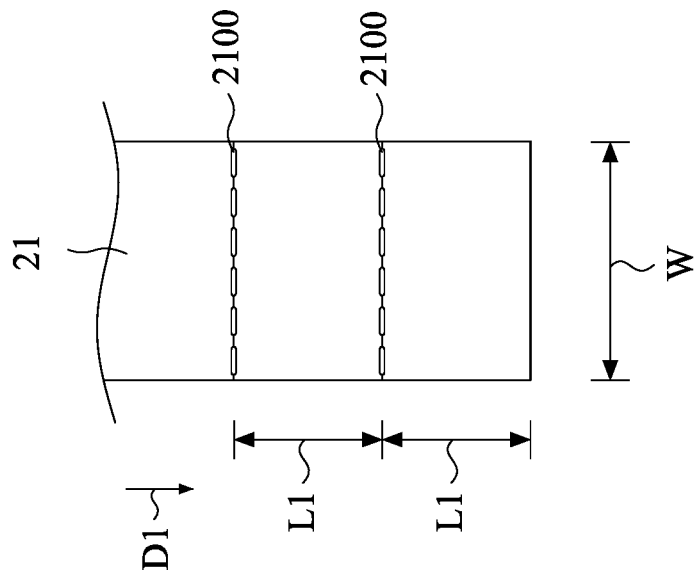
FIG. 3A is a plan view schematically illustrating the first fiber product is cut to form multiple dashed lines according to the present invention.

The lower feeding roller 236 has a rotational speed greater than that of the upper feeding roller 232, and the speed difference between the two helps maintain a tension of the first fiber product 21 during the conveyance thereof to thereby assist the first dashed-line roller 233 to carry out, in combination with the first dashed-line cutter 234, the intermittent dashed-line cutting on the first fiber product 21 to form, through such cutting, a plurality of first dashed lines 2100 in a width direction W in the first fiber product 21 (also see FIG. 3A). The first dashed lines 2100 are spaced from each other, in the first conveying direction D1, by a spacing distance or interval L1.

Through control of the rotational speed of the first dashed-line roller 233, in combination with the first dashed-line cutter 234, the interval L1 between every two adjacent first dashed lines 2100 of the first fiber product 21 can be adjusted.

The first severing device 25 comprises a first severing roller 253, a first severing cutter 254, and a first intermediate roller 255. The first fiber product 21 that has been subject to intermittent dashed-line cutting passes between the first severing roller 253 and the first severing cutter 254, and is then moved to the first intermediate roller 255 adjacent thereto to finally reach the first folding roller 27 to proceed with folding.

The first severing roller 253, the first intermediate roller 255, and the first folding roller 27 are all connected with a vacuum suction device (not shown in the drawings), so that the first fiber product 21, during the course of passing over the first severing roller 253, is sucked onto and kept on a roller surface of the first severing roller 253, without shifting, and is similarly vacuum-sucked onto and kept on roller surfaces during the courses of passing over the first intermediate roller 255 and the first folding roller 27, so as to facilitate subsequent transferring and folding procedures.

Figure 2B:
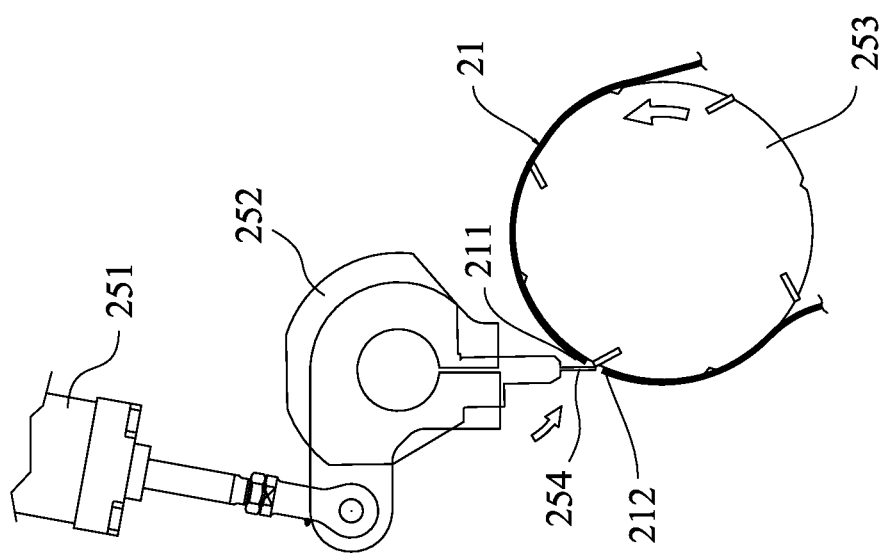
FIG. 2B is a schematic view illustrating an operation of cutting off a first fiber product by a first cutter set corresponding to a first cutter roller.

When the first fiber product 21 that has been subject to intermittent dashed-line cutting is moved in the conveying direction D1 to reach a predetermined length, the first severing cutter 254 is driven by a first cutter drive device 251 and a first cutter carrier 252 to advance to completely sever the first fiber product 21 that is suction-attached to the roller surface of the first severing roller 253, as shown in FIG. 2B. Under this condition, the first fiber product 21 is severed and split to generate a leading end 212 and a tail end 211, in order to facilitate separation during stack switching.

The second dashed-line cutting device 24 comprises two upper feeding rollers 241, 242 that are adjacent to each other, a second dashed-line roller 243, a second dashed-line cutter 244, two lower feeding rollers 245, 246 that are adjacent to each other, and a rolling wheel 247. The second dashed-line roller 243 has a roller surface that includes a plurality of cutters and a plurality of notches that are arranged thereon in a mutually spaced manner. The second fiber product 22 is drawn in by a rolling wheel 247, passing between the two adjacent upper feeding rollers 241, 242, and advancing in a second conveying direction D2 to pass between the second dashed-line roller 243 and the second dashed-line cutter 244 to then move to a location between the lower feeding rollers 245, 246.

Figure 3B:
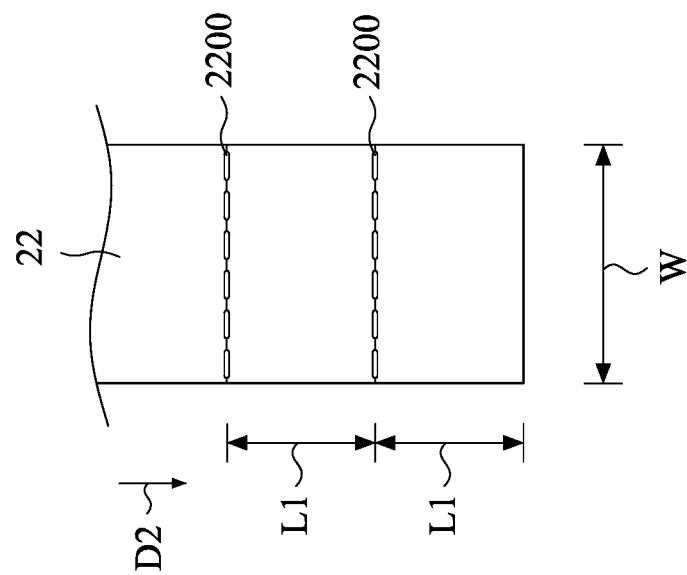
FIG. 3B is a plan view schematically illustrating a second fiber product is cut to form multiple dashed lines according to the present invention.

The lower feeding roller 246 has a rotational speed greater than that of the upper feeding roller 242, and the speed difference between the two helps maintain a tension of the second fiber product 22 during the conveyance thereof to thereby assist the second dashed-line roller 243 to carry out, in combination with the second dashed-line cutter 244, the intermittent dashed-line cutting on the second fiber product 22 to form, through such cutting, a plurality of second dashed lines 2200 in a width direction W in the second fiber product 22 (also see FIG. 3B). The second dashed lines 2200 are spaced from each other, in the second conveying direction D2, by a spacing distance or interval L1.

Through control of the rotational speed of the second dashed-line roller 243, in combination with the second dashed-line cutter 244, the interval L1 between every two adjacent second dashed lines 2200 of the second fiber product 22 can be adjusted.

The second severing device 26 comprises a second severing roller 263, a second severing cutter 264, and a second intermediate roller 265. The second fiber product 22 that has been subject to intermittent dashed-line cutting passes between the second severing roller 263 and the second severing cutter 264, and is then moved to the second intermediate roller 265 adjacent thereto to finally reach the second folding roller 28 to proceed with folding.

The second severing roller 263, the second intermediate roller 265, and the second folding roller 28 are all connected with a vacuum suction device (not shown in the drawings), so that the second fiber product 22, during the course of passing over the second severing roller 263, is sucked onto and kept on a roller surface of the second severing roller 263, without shifting, and is similarly vacuum-sucked onto and kept on roller surfaces during the courses of passing over the second intermediate roller 265 and the second folding roller 28, so as to facilitate subsequent transferring and folding procedures.

When the second fiber product 22 that has been subject to intermittent dashed-line cutting is moved in the conveying direction D2 to reach a predetermined length, the second severing cutter 264 is driven by a second cutter drive device 261 and a second cutter carrier 262 to advance to completely sever the second fiber product 22 that is suction-attached to the roller surface of the second severing roller 263, in order to facilitate separation during stack switching.

The first folding roller 27 and the second folding roller 28 are arranged adjacent to each other, and the two are rotated in opposite directions, in order to proceed with folding of the first fiber product 21 and the second fiber product 22 that are moved to pass between the two.

FIGS. 4A-4E are schematic views demonstrating an operation of folding two fiber products in a C-shaped fold fashion with the folding apparatus 20 according to the present invention. As shown in the drawings, the first fiber product 21 and the second fiber product 22 that have been subject to intermittent dashed-line cutting by the first dashed-line cutting device 23 and the second dashed-line cutting device 24, respectively, are formed with a plurality of dashed lines 2100, 2200 that are spaced from each other by an interval L1 but are not cut off and severed. Thus, the first fiber product 21 and the second fiber product 22 are respectively fed into the first folding roller 27 and the second folding roller 28 to proceed with interlaced folding, of which a fold length is designated as M.

Through control of the rotational speeds of the first dashed-line roller 233 and the second dashed-line roller 243, the interval L1 between adjacent ones of the first dashed lines 2100 of the first fiber product 21 and the interval L1 between adjacent ones of the second dashed lines 2200 of the second fiber product 22 are adjustable in respect of the size or length thereof.

Figure 4A:
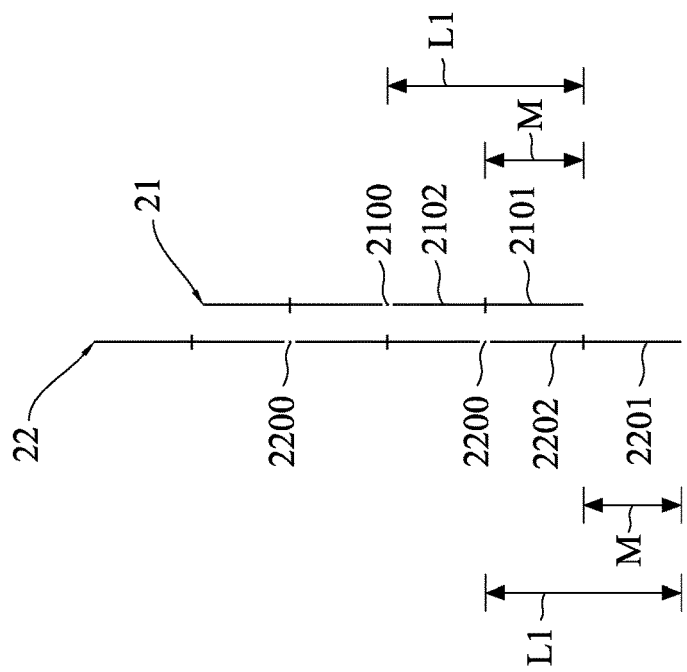
FIGS. 4A-4E are schematic views demonstrating an operation of folding two fiber products in a C-shaped fold fashion with a folding apparatus according to the present.
Figure 4B:
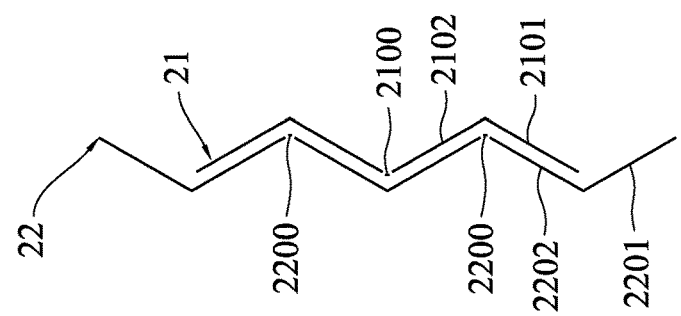
Figure 4C:
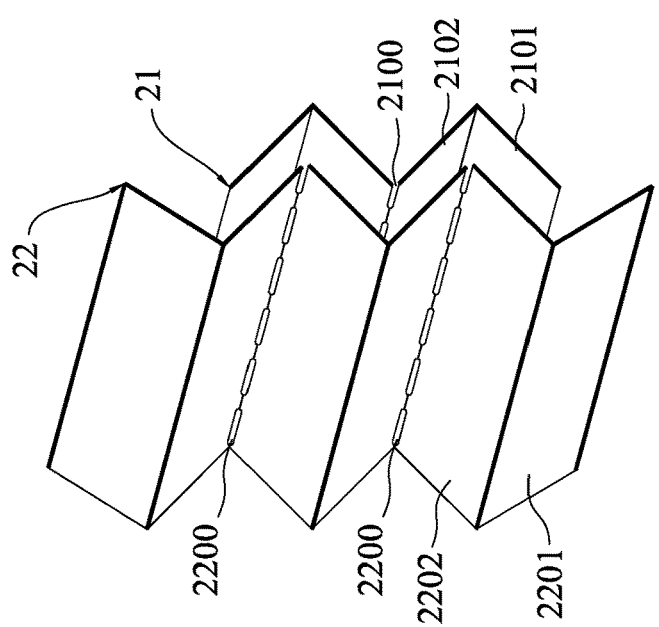

Each of the intervals L1 of the first fiber product 21 includes a first folding portion 2101, a second folding portion 2102, and a first dashed line 2100. In the instant embodiment, a total length of the first folding portion 2101 and the second folding portion 2102, as a sum of lengths thereof, is twice of the fold length M. Similarly, each of the intervals L1 of the second fiber product 22 includes a first folding portion 2201, a second folding portion 2202, and a second dashed line 2200, wherein a total length of the first folding portion 2201 and the second folding portion 2202, as a sum of lengths thereof, is twice of the fold length M, as depicted in FIGS. 4A-4C.

Figure 4D:
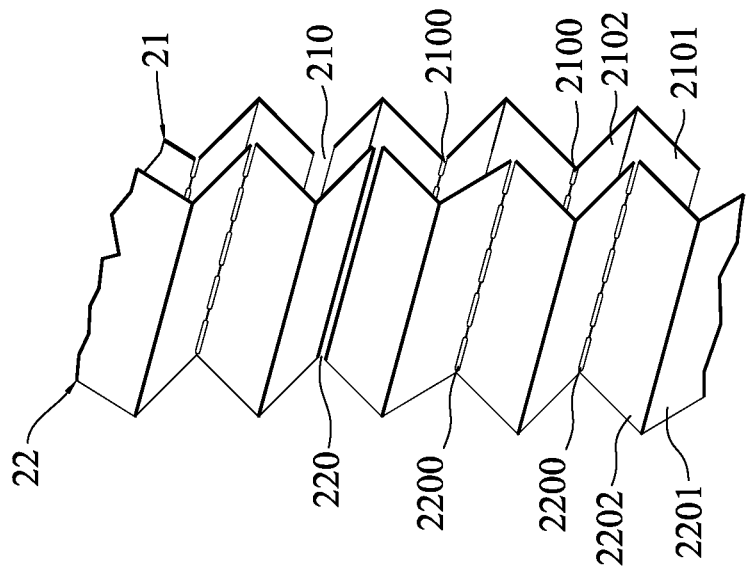
Figure 4E:
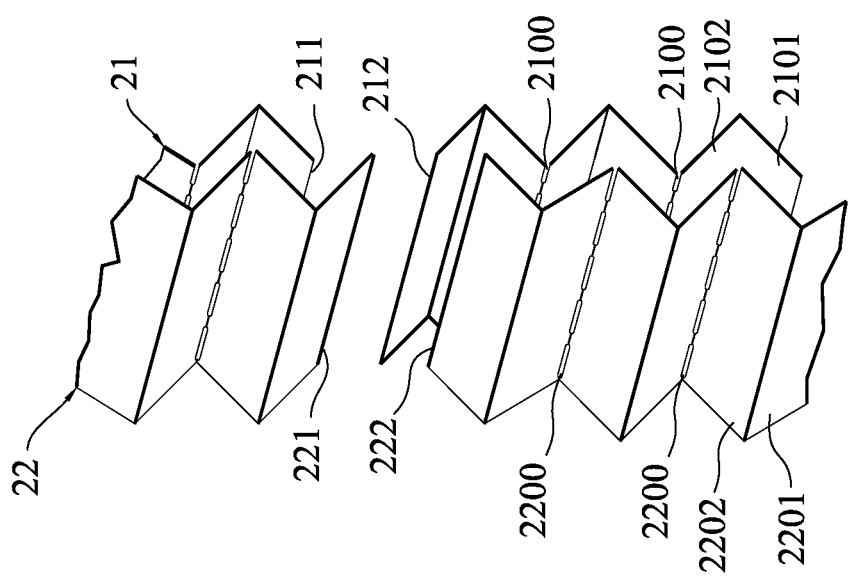

Referring to FIGS. 4D-4E, when the first fiber product 21 and the second fiber product 22 that have been subject to the intermittent dashed-line cutting are moved to reach a predetermined value of length thereof, a stack switching procedure is performed. During the stack switching procedure, the first severing cutter 254 and the second severing cutter 264 are advanced to respectively sever the first fiber product 21 and the second fiber product 22 that are respectively suction-attached to the first severing roller 253 and the second severing roller 263 the roller surface, such that the first fiber product 21 and the second fiber product 22 respectively generate severing gaps 210, 220, and thus, the first fiber product 21 is severed and split to generate a leading end 212 and a tail end 211, and the second fiber product 22 is also severed and split to generate a leading end 222 and a tail end 221, achieving separation of each of the fiber products. As such, a round of folding procedure is completed and a next round of folding may proceed.

Figure 5A:
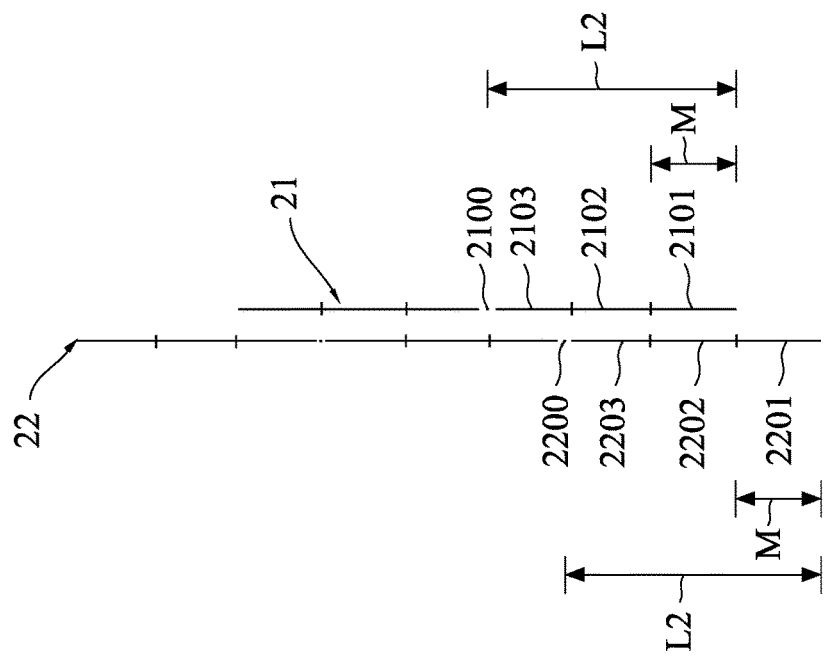
FIGS. 5A-5C are schematic views demonstrating an operation of folding two fiber products in a Z-shaped fold fashion with a folding apparatus according to the present.
Figure 5B:
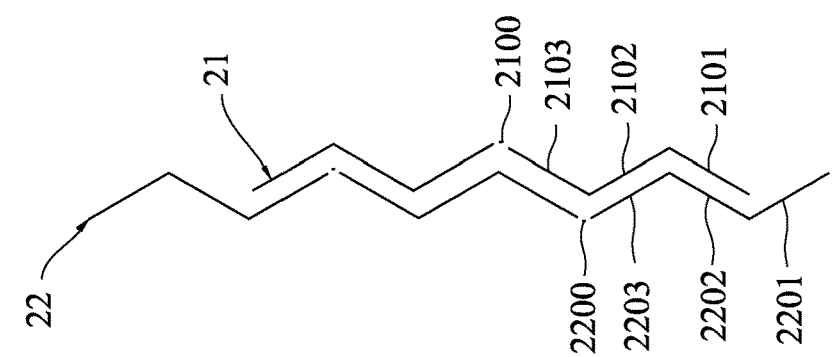
Figure 5C:
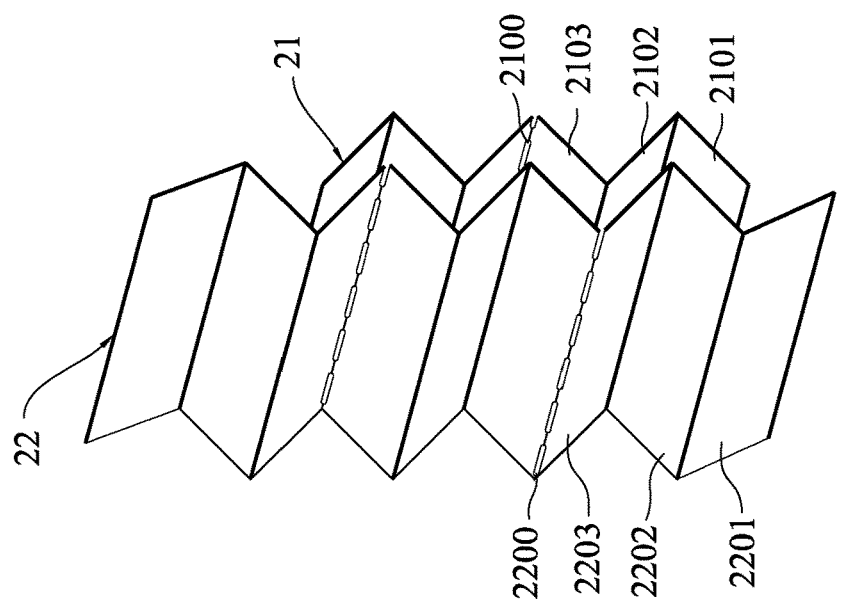

FIGS. 5A-5C are schematic views demonstrating an operation of folding two fiber products in a Z-shaped fold fashion with the folding apparatus 20 according to the present. As shown in the drawings, the first fiber product 21 and the second fiber product 22 that have been subject to intermittent dashed-line cutting are respectively formed with a plurality of dashed lines 2100, 2200 that are spaced from each other by an interval L2 but are not cut off and severed. Thus, the first fiber product 21 and the second fiber product 22 are respectively fed into the first folding roller 27 and the second folding roller 28 to proceed with interlaced folding, of which a fold length is designated as M.

Through control of the rotational speeds of the first dashed-line roller 233 and the second dashed-line roller 243, the interval L2 between adjacent ones of the first dashed lines 2100 of the first fiber product 21 and the interval L2 between adjacent ones of the second dashed lines 2200 of the second fiber product 22 are adjustable in respect of the size or length thereof.

In the instant embodiment, each of the intervals L2 of the first fiber product 21 includes a first folding portion 2101, a second folding portion 2102, a third folding portion 2103, and a first dashed line 2100. A total length of the first folding portion 2101, the second folding portion 2102, and the third folding portion 2103, as a sum of lengths thereof, is three times of the fold length M. Similarly, each of the intervals L2 of the second fiber product 22 includes a first folding portion 2201, a second folding portion 2202, a third folding portion 2203, and a second dashed line 2200, wherein a total length of the first folding portion 2201, the second folding portion 2202, and the third folding portion 2203, as a sum of lengths thereof, is three times of the fold length M.

Figure 6A:
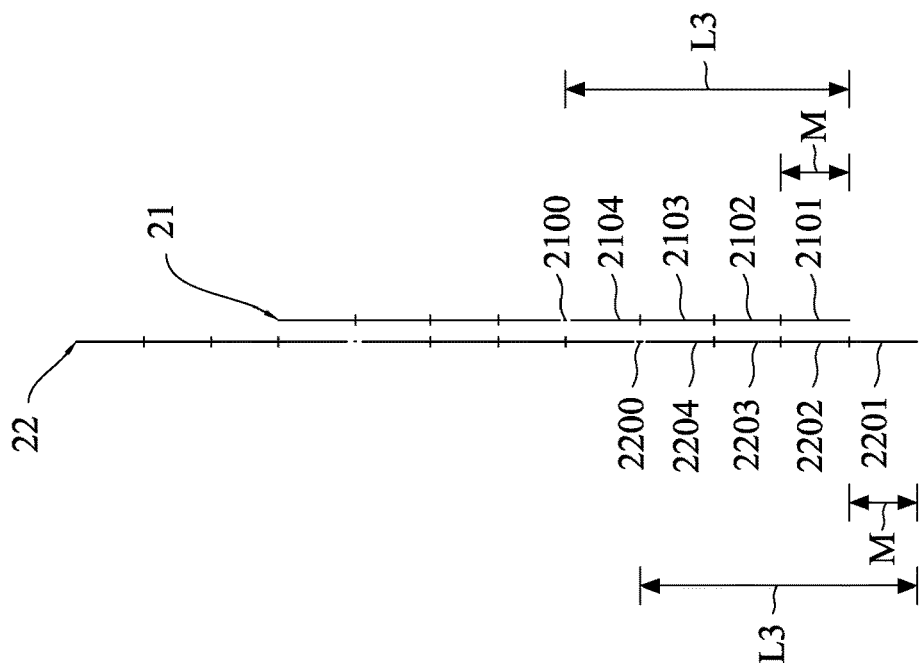
FIGS. 6A-6C are schematic views demonstrating an operation of folding two fiber products in a W-shaped fold fashion with a folding apparatus according to the present.
Figure 6B:
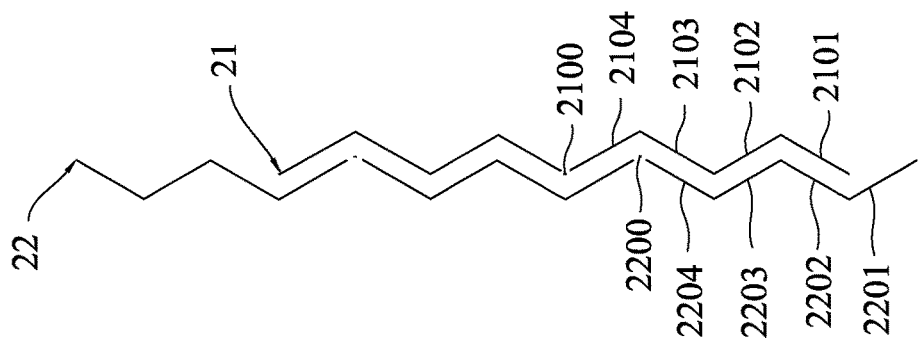
Figure 6C:
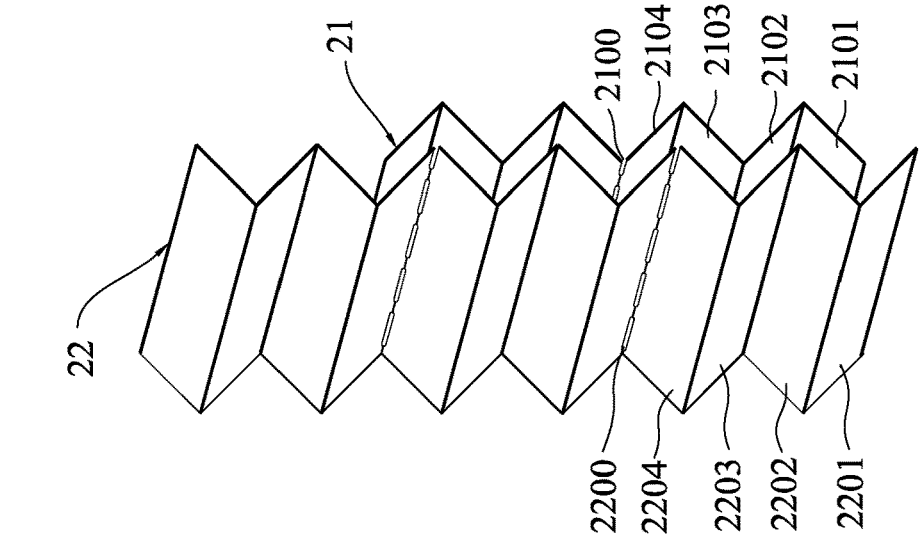

FIGS. 6A-6C are schematic views demonstrating an operation of folding two fiber products in a W-shaped fold fashion with the folding apparatus 20 according to the present. As shown in the drawings, the first fiber product 21 and the second fiber product 22 that have been subject to intermittent dashed-line cutting are respectively formed with a plurality of dashed lines 2100, 2200 that are spaced from each other by an interval L3 but are not cut off and severed. Thus, the first fiber product 21 and the second fiber product 22 are respectively fed into the first folding roller 27 and the second folding roller 28 to proceed with interlaced folding, of which a fold length is designated as M.

Through control of the rotational speeds of the first dashed-line roller 233 and the second dashed-line roller 243, the interval L3 between adjacent ones of the first dashed lines 2100 of the first fiber product 21 and the interval L3 between adjacent ones of the second dashed lines 2200 of the second fiber product 22 are adjustable in respect of the size or length thereof.

In the instant embodiment, each of the intervals L3 of the first fiber product 21 includes a first folding portion 2101, a second folding portion 2102, a third folding portion 2103, a fourth folding portion 2104, and a first dashed line 2100. A total length of the first folding portion 2101, the second folding portion 2102, the third folding portion 2103, and the fourth folding portion 2104, as a sum of lengths thereof, is four times of the fold length M. Similarly, each of intervals L3 of the second fiber product 22 includes a first folding portion 2201, a second folding portion 2202, a third folding portion 2203, a fourth folding portion 2204 and a second dashed line 2200, wherein a total length of the first folding portion 2201, the second folding portion 2202, the third folding portion 2203, and the fourth folding portion 2204, as a sum of lengths thereof, is four times of the fold length M.

In the embodiment illustrated in FIGS. 6A-6C, adjustment may be made to have the interval L3 between adjacent ones of the dashed lines of each or either one of the first fiber product 21 and the second fiber product 22 greater than four times of the fold length M. In this way, the first fiber product 21 and the second fiber product 22 can be folded in a multi-fold fashion.

Figure 7A:
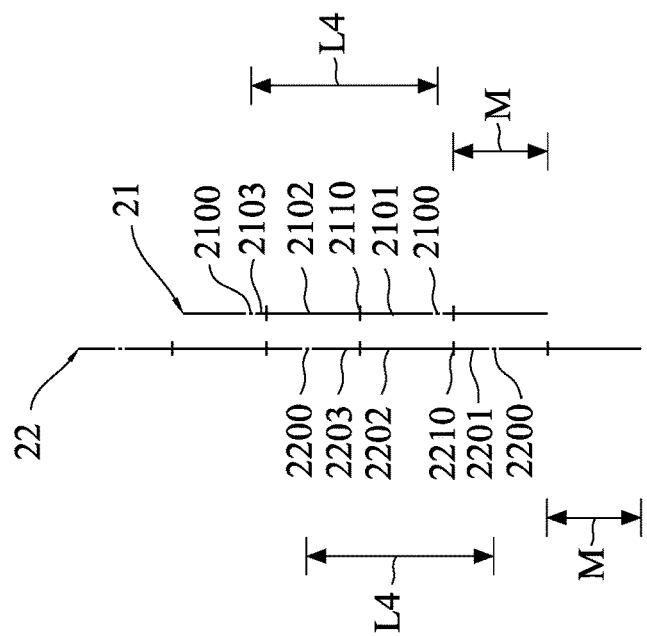
FIGS. 7A-7C are schematic views illustrating intervals between dashed lines formed in two fiber products according to the present invention is greater than a fold length and is not an integer multiple of the fold length.
Figure 7B:
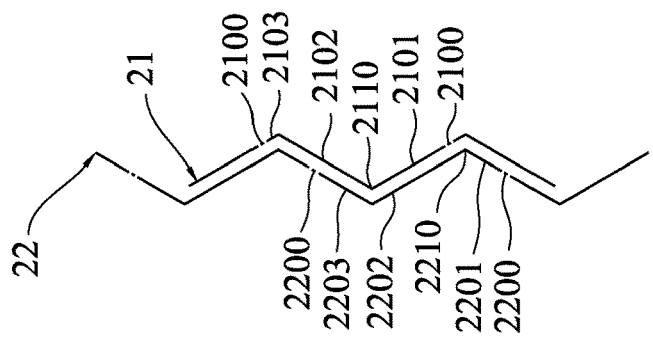
Figure 7C:
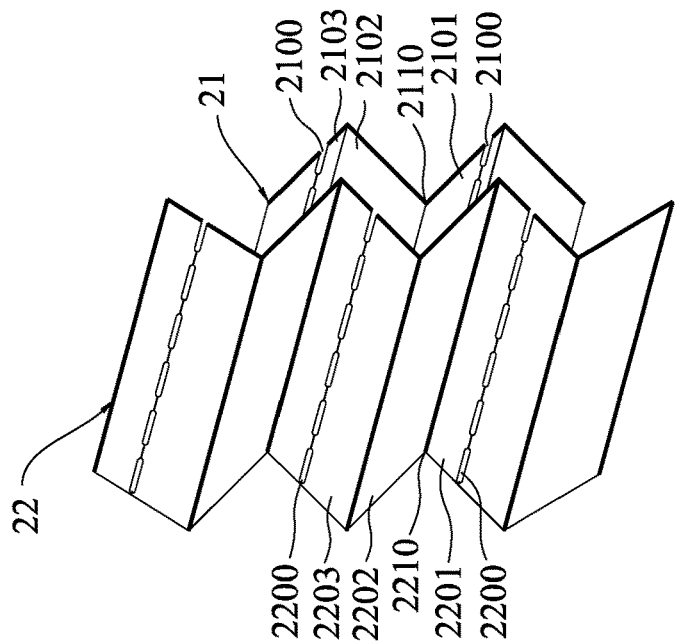

FIGS. 7A-7C are schematic views demonstrating an operation of folding two fiber products with the folding apparatus 20 according to the present invention. As shown in the drawings, the first fiber product 21 and the second fiber product 22 that have been subject to intermittent dashed-line cutting are respectively formed with a plurality of first dashed lines 2100 and a plurality of second dashed lines 2200, which are spaced from each other by an interval L4, but are not cut off and severed. Thus, the first fiber product 21 and the second fiber product 22 are respectively fed into the first folding roller 27 and the second folding roller 28 to proceed with interlaced folding, of which a fold length is designated as M.

Through control of the rotational speeds of the first dashed-line roller 233 and the second dashed-line roller 243, the interval L4 between adjacent ones of the first dashed lines 2100 of the first fiber product 21 and the interval L4 between adjacent ones of the second dashed lines 2200 of the second fiber product 22 are adjustable in respect of the size or length thereof.

In the instant embodiment, each of the intervals L4 of the first fiber product 21 includes a first folding portion 2101, a second folding portion 2102, a third folding portion 2103, a first dashed line 2100, and at least one fold crease 2110. A total length of the first folding portion 2101, the second folding portion 2102, and the third folding portion 2103, as a sum of lengths thereof, is a non-integer multiple of the fold length M, so that in the folding of the first fiber product 21, the first dashed line 2100 is not at the location of the fold crease 2110 during the folding.

Similarly, the interval L4 of the second fiber product 22 includes a first folding portion 2201, a second folding portion 2202, a third folding portion 2203, a second dashed line 2200, and at least one fold crease 2210. A total length of the first folding portion 2201, the second folding portion 2202, and the third folding portion 2203, as a sum of lengths thereof, is a non-integer multiple of the fold length M, so that in the folding of the second fiber product 22, the second dashed line 2200 is not at the location of the fold crease 2210 during the folding.

In summary, the present invention provides a folding apparatus 20 that enables adjustment of the size or length of a single sheet of a fiber product, allowing for folding in multiple forms, without the need of switching among different machines. As such, the cost is reduced and the space available for uses is increased.

The embodiments provided above are only for illustration of the present invention and are not intended to limit the scope of the present invention. Equivalent variations and modifications that fall within the spirit of the present invention are considered within the scope of the present invention that is solely defined in the appended claims.

What is claimed is:
1. A fiber product folding apparatus, comprising:
a first dashed-line cutting device including a first dashed-line cutter and a first dashed-line roller arranged adjacent to the first dashed-line cutter, wherein a first fiber product moves in a first conveying direction to pass between the first dashed-line cutter and the first dashed-line roller, and the first dashed-line cutter is operable with respect to the first dashed-line roller to form a plurality of first dashed lines on the first fiber product across a width direction of the first fiber product, wherein adjacent first dashed lines are spaced from each other by an interval along the first conveying direction, and the interval between the adjacent first dashed lines is adjustable by controlling a rotational speed of the first dashed-line roller with respect to the first dashed-line cutter;
a first severing device including a first severing cutter, a first severing roller adjacent to the first severing cutter, and a first intermediate roller adjacent to the first severing roller, wherein the first severing roller receives the first fiber product that is formed with the first dashed lines, and when a length of the received first fiber product does not reach a predetermined length, the first severing cutter is kept inactive, and the first fiber product is forwarded to the first intermediate roller;

a first folding roller adjacent to the first intermediate roller and arranged to receive the first fiber product via the first intermediate roller;

a second dashed-line cutting device including a second dashed-line cutter and a second dashed-line roller arranged adjacent to the second dashed-line cutter, wherein a second fiber product moves in a second conveying direction to pass between the second dashed-line cutter and the second dashed-line roller, and the second dashed-line cutter is operable with respect to the second dashed-line roller to form a plurality of second dashed lines on the second fiber product across the width direction of the second fiber product, wherein adjacent second dashed lines are spaced from each other by an interval along the second conveying direction, and the interval between the adjacent second dashed lines is adjustable by controlling a rotational speed of the second dashed-line roller with respect to the second dashed-line cutter;

a second severing device including a second severing cutter, a second severing roller adjacent to the second severing cutter, and a second intermediate roller adjacent to the second severing roller, wherein the second severing roller receives the second fiber product that is formed with the second dashed lines, and when a length of the received second fiber product does not reach a predetermined length, the second severing cutter is kept inactive, and the second fiber product is forwarded to the second intermediate roller; and a second folding roller adjacent to the second intermediate roller and arranged to receive the second fiber product via the second intermediate roller;

wherein the first folding roller and the second folding roller are arranged adjacent to each other and are operable to perform folding of the first fiber product and the second fiber product that pass between the first folding roller and the second folding roller at a fold length.

2. The fiber product folding apparatus according to claim 1, wherein when the length of the first fiber product received by the first severing roller reaches the predetermined length, the first severing cutter is activated to cut off and sever the first fiber product.

3. The fiber product folding apparatus according to claim 1, wherein the length of the second fiber product received by the second severing roller reaches the predetermined length, the second severing cutter is activated to cut off and sever the second fiber product.

4. The fiber product folding apparatus according to claim 1, wherein the first dashed-line cutting device further comprises at least one upper feeding roller disposed above the first dashed-line roller and at least one lower feeding roller disposed below the first dashed-line roller, wherein the first fiber product moves from the at least one upper feeding roller to pass between the first dashed-line roller and the first dashed-line cutter and is then advanced to the at least one lower feeding roller, the at least one lower feeding roller having a rotational speed greater than a rotational speed of the at least one upper feeding roller, such that a speed difference between the at least one lower feeding roller and the at least one upper feeding roller maintains a tension of the first fiber product during conveyance thereof to assist the first dashed-line roller to carry out, with respect to the first dashed-line cutter, cutting on the first fiber product to form the plurality of first dashed lines.

5. The fiber product folding apparatus according to claim 1, wherein the second dashed-line cutting device further comprises at least one upper feeding roller disposed above the second dashed-line roller and at least one lower feeding roller disposed below the second dashed-line roller, wherein the second fiber product moves from the at least one upper feeding roller to pass between the second dashed-line roller and the second dashed-line cutter and is then advanced to the at least one lower feeding roller, the at least one lower feeding roller having a rotational speed greater than a rotational speed of the at least one upper feeding roller, such that a speed difference between the at least one lower feeding roller and the at least one upper feeding roller maintains a tension of the second fiber product during conveyance thereof to assist the second dashed-line roller to carry out, with respect to the second dashed-line cutter, cutting on the second fiber product to form the plurality of second dashed lines.

6. The fiber product folding apparatus according to claim 1, wherein the interval between the adjacent first dashed lines of the first fiber product and the interval between the adjacent second dashed lines of the second fiber product are each twice of the fold length, to carry out folding of the first fiber product and the second fiber product passing between the first folding roller and the second folding roller in a C-shaped fold fashion.

7. The fiber product folding apparatus according to claim 1, wherein the interval between the adjacent first dashed lines of the first fiber product and the interval between the adjacent second dashed lines of the second fiber product are each three times of the fold length, to carry out folding of the first fiber product and the second fiber product passing between the first folding roller and the second folding roller in a Z-shaped fold fashion.

8. The fiber product folding apparatus according to claim 1, wherein the interval between the adjacent first dashed lines of the first fiber product and the interval between the adjacent second dashed lines of the second fiber product are each four times of the fold length, to carry out folding of the first fiber product and the second fiber product passing between the first folding roller and the second folding roller in a W-shaped fold fashion.

9. The fiber product folding apparatus according to claim 1, wherein the interval between the adjacent first dashed lines of the first fiber product and the interval between the adjacent second dashed lines of the second fiber product are each greater than four times of the fold length, to carry out folding of the first fiber product and the second fiber product passing between the first folding roller and the second folding roller in a multi-fold fashion.

10. The fiber product folding apparatus according to claim 1, wherein the interval between the adjacent first dashed lines of the first fiber product and the interval between the adjacent second dashed lines of the second fiber product are each greater than the fold length and are each a non-integer multiple of the fold length.

* * * * *